United States Patent
Diedrich et al.

(10) Patent No.: US 7,272,584 B2
(45) Date of Patent: Sep. 18, 2007

(54) USE OF DOMINANCE TO IMPROVE PERFORMANCE OR INCREASE SEARCH SPACE IN GENETIC ALGORITHMS

(75) Inventors: Michael J. Diedrich, Rochester, MN (US); Richard A. Diedrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/793,527

(22) Filed: Mar. 4, 2004

(65) Prior Publication Data

US 2005/0197787 A1 Sep. 8, 2005

(51) Int. Cl.
G06F 15/18 (2006.01)
G06N 3/00 (2006.01)
G06N 3/12 (2006.01)

(52) U.S. Cl. ...................................................... 706/13
(58) Field of Classification Search .................. 706/13
See application file for complete search history.

(56) References Cited

OTHER PUBLICATIONS

Fang Cheng Hsu Jiah-Shing Chen, "A study on multi criteria decision making model: interactivegenetic algorithms approach", Systems, Man, and Cybernetics, 1999. IEEE SMC '99 Conference Proceedings. 1999 IEEE International Conference on, Oct. 12, 1999-Oct. 15, 1999, pp. 634-639 vol. 3.*

David E. Goldberg, Robert E. Smith, "Nonstationary function optimization using genetic algorithm with dominance and diploidy", Proceedings of the Second International Conference on Genetic Algorithms on Genetic algorithms and their application, 1987, pp. 59-68.*

T Schnier, JS Gero, "Dominant and Recessive Genes in Evolutionary Systems Applied to Spatial Reasoning", Proceedings of the 10th Australian Joint Conference on Artificial Intelligence: Advanced Topics in Artificial Intelligence , 1997, pp. 127-136.*

J Lewis, E Hart, G Ritchie, "A comparison of dominance mechanisms and simple mutation on non-stationary problems", Parallel Problem Solving from Nature—PPSN V: 5th International Conference Amsterdam, The Netherlands, Sep. 27-30, 1998 Proceedings, pp. 139-148.*

* cited by examiner

Primary Examiner—Anthony Knight
Assistant Examiner—Michael B. Holmes
(74) Attorney, Agent, or Firm—Patterson & Sheridan

(57) ABSTRACT

Methods, systems, and articles of manufacture utilizing the biological principle of dominance to affect the operation of a genetic algorithm are provided. The genetic algorithm may be used to select a multi-parameter solution set to a user-defined problem, with each parameter modeled as a gene. Dominance may be introduced by associating a dominance attribute with one or more gene values (i.e., traits), for example, that are known to lead to good solution sets, allowing the corresponding gene values to be specified as dominant or recessive. By specifying the known good gene values as dominant, system performance may be optimized as the genetic algorithm may quickly arrive at a good solution set (e.g., due to the known good value appearing more often in future generations). On the other hand, by specifying the known good gene value as recessive, the search space may be increased as the genetic algorithm may evaluate a larger number of possible solution sets (e.g., due to the known good value appearing less often in future generations).

19 Claims, 6 Drawing Sheets

FIG. 3B

GENETIC ALGORITHM SETUP — 320

| GENE | POSSIBLE VALUES | DOMINANT |
|------|-----------------|----------|
| 1 | A a | A — 322 |
| 2 | B b | - |
| ... | | |
| N | X x | - |

ADD/REMOVE GENES — 308

SEARCH OPTIMIZATION — 324
◉ QUICK  ○ EXPANDED

DEFINE FITNESS EVALUATION FORMULA — 316

[OK]  [CANCEL]

FIG. 3A

GENETIC ALGORITHM SETUP — 300

| GENE | POSSIBLE VALUES | DOMINANT |
|------|-----------------|----------|
| 1 | A a | A — 306 |
| 2 | B b | - |
| ... | | |
| N | X x | - |

ADD/REMOVE GENES — 308

DEFINE FITNESS EVALUATION FORMULA — 310

[OK]  [CANCEL]

USE OF DOMINANCE TO IMPROVE PERFORMANCE OR INCREASE SEARCH SPACE IN GENETIC ALGORITHMS

BACKGROUND OF THE INVENTION

1. Field of the Invention

The present invention generally relates to genetic algorithms and, more particularly, to methods and systems that utilize the concept of dominance to affect the manner in which genetic algorithms achieve a desired solution set.

2. Description of the Related Art

Computer programming searching techniques referred to as genetic algorithms are based on the concept that evolutionary principles may be applied to solve complex problems involving multiple parameters. Each parameter may be modeled as a gene having different possible gene values (or "traits"), and each individual combination of genes (hereinafter an "individual") may be considered a candidate solution. The idea is that the population of individuals may evolve over generations, using operators inspired by natural genetic variation and natural selection, for example, based on fitness.

Typically, an initial population of individuals is defined. The fitness of the population's individuals is then evaluated based on some type of fitness evaluation function. A selection process based on this fitness evaluation is typically used to select a limited number of individuals used to produce new individuals using the standard genetic algorithm operations of crossover and mutation. These steps may be repeated to produce and evaluate future generations a set number of times or until an acceptable solution is achieved (e.g., as determined by a pre-defined threshold fitness level).

The types of evaluation functions used to determine fitness may vary widely with different applications and either lower or higher results may correspond to fitter individuals, depending on the problem being solved. For example, if the problem is to minimize material expenditures (e.g., in IC layout) or time (e.g., route scheduling), individuals with lower corresponding evaluation scores may be considered more fit. On the other hand, if the problem is to maximize a value (e.g., a score in a game or a production yield), individuals with higher corresponding evaluation scores may be considered more fit.

In either case, for some applications, it may be more desirable to reach an acceptable solution quickly rather than find an ideal solution. For example, in a computer-based gaming environment where a user is matched against a computer, the computer may be required to select an acceptable solution set for a next move in the game quickly (in "real time"). For other applications, however, time constraints may be relaxed and it may be more desirable to select an ideal solution. For example, in applications used to provide districting options for governmental entities (e.g., school or voting districts), it may be more important to achieve an optimal result even if it takes days or weeks.

Accordingly, there is a need for methods and systems that allow genetic algorithms to be optimized, for example, to improve system performance (e.g., in an effort to find an acceptable solution quickly) or to increase search space (e.g., to find an optimal solution).

SUMMARY OF THE INVENTION

Embodiments of the present invention generally provide methods, systems, and articles of manufacture that may be used to specify a combination of parameter values for use in solving a problem.

One embodiment provides a method for selecting a combination of parameter values for use in solving a problem involving multiple parameters. The method generally includes representing the multiple parameters as a set of genes, each gene having a corresponding set of allowable gene values and specifying, via a configurable dominance attribute, whether at least one of the allowable gene values is dominant or recessive. A population of individuals, each comprising multiple sets of genes with corresponding gene values (that represent a candidate solution) may be initialized. Genetic algorithm operations may be performed to modify the population and to select one or more combinations of gene values, wherein the population is modified based, at least in part, on the specified dominance attribute.

Another embodiment provides a computer-readable medium, containing a program for use in specifying at least one combination of parameter values representing a candidate solution for use in solving a problem. When executed by a processor, the program performs operations generally including representing the multiple parameters as a set of genes, each gene having a corresponding set of allowable gene values, providing an interface allowing specification of, via one or more configurable dominance attributes, whether at least one of the allowable gene values is at least one of dominant or recessive, initializing a population of candidate solution sets, each comprising a set of genes with corresponding gene values, and performing a genetic algorithm to modify the population and to select one or more combinations of parameter values, wherein the population is modified based, at least in part, on the one or more specified dominance attributes.

Another embodiment provides a system generally including a population of individuals, an interface, and a genetic algorithm. Each individual comprises a combination of gene values that represents a candidate solution set for use in solving a problem involving multiple parameters. The interface generally allows a user to configure at least one dominance attribute used to specify one or more gene values as at least one of dominant or recessive. The genetic algorithm may be used to evaluate fitness of the individuals, modifying the population based, at least in part, on the fitness of the individuals and the dominance attribute, and to identify one or more individuals as good candidate solution sets.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 3A and 3B illustrate exemplary graphical user interface (GUI) screens for specifying dominance attributes in a genetic algorithm.

DETAILED DESCRIPTION OF THE PREFERRED EMBODIMENTS

Figure 1:
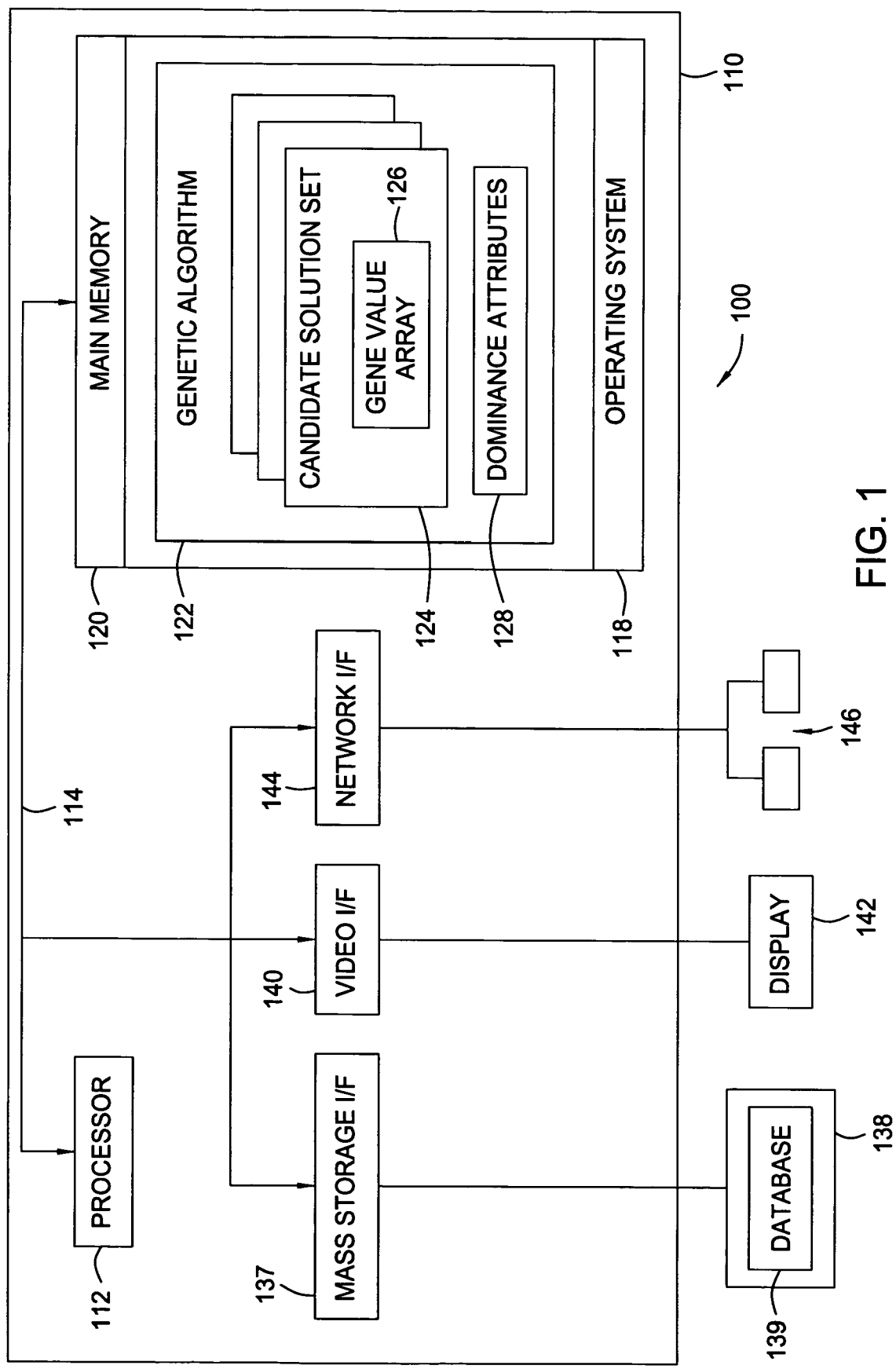
FIG. 1 illustrates an exemplary computer system in which embodiments of the present invention may be practiced.

Embodiments of the present invention utilize the biological principle of dominance to affect the operation of a genetic algorithm. The genetic algorithm may be used to select a multi-parameter solution set to a user-defined problem, with each parameter modeled as a gene. Dominance may be introduced by associating a dominance attribute with one or more gene values (i.e., traits), for example, that are known to lead to good solution sets, allowing the corresponding gene values to be specified as dominant or recessive. By specifying the known good gene values as dominant, system performance may be optimized as the genetic algorithm may quickly arrive at a good solution set (e.g., due to the known good value appearing more often in future generations). On the other hand, by specifying the known good gene value as recessive, the search space may be increased as the genetic algorithm may evaluate a larger number of possible solution sets (e.g., due to the known good value appearing less often in future generations).

As used herein, the term good solution set generally refers to a solution set leading to a desired result, for example, as determined by a fitness score achieved when evaluating the solution set with a fitness evaluation formula. Accordingly, in some cases, a solution set may still be considered good even though other solution sets may lead to better fitness evaluations. As used herein, the term search space generally refers to those candidate solution sets that have been or will be evaluated when searching for a desired solution set, rather than the entire set of possible candidate solution sets. Further, the terms expanding or limiting when applied to a search space generally refer to the number of candidate solution sets that will be evaluated in one situation (e.g., a relevant gene value is specified as dominant) relative to another situation (e.g., the same relevant gene value is specified as recessive).

One embodiment of the invention is implemented as a program product for use with a computer system such as, for example, the computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary System

Referring now to FIG. 1, a computing environment 100 is shown. In general, the computing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own. The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, a mass storage interface 137 operably connected to a direct access storage device 138 having a database 139, a video interface 140 operably connected to a display 142, and a network interface 144 operably connected to the plurality of networked devices 146. The display 142 may be any video output device for outputting viewable information.

Computer system 110 is shown comprising at least one processor 112, which obtains instructions and data via a bus 114 from a memory 120. The processor 112 could be any processor adapted to support the methods of the invention. The memory 120 is any memory sufficiently large to hold the necessary programs and data structures. Memory 120 could be one or a combination of memory devices, including Random Access Memory, nonvolatile or backup memory, (e.g., programmable or Flash memories, read-only memories, etc.). In addition, memory 120 may be considered to include memory physically located elsewhere in a computer system 110, for example, any storage capacity used as virtual memory or stored on a mass storage device (e.g., direct access storage device 138) or on another computer coupled to the computer system 110 via bus 114.

The memory 120 is shown configured with an operating system 118. The operating system 118 is the software used for managing the operation of the computer system 100. Examples of the operating system 118 include IBM OS/400®, UNIX, Microsoft Windows®, and the like. The memory 120 further includes one or more application programs implementing a genetic algorithm 122 generally configured to identify a good solution set to a problem involving multiple parameters.

As described in greater detail below, the genetic algorithm 122 may be configured to evolve (e.g., maintain, generate, and evaluate) a "population" of individual candidate solution sets 124. Each candidate solution set 124 is a combination of the multiple parameters, illustratively embodied as an array of gene values 126. Evolution of the population of candidate solution sets 124 may be affected by a set of dominance attributes indicating particular gene values (or traits) specified as dominant or recessive. As will be described in greater detail below, the search space for good solution sets may be focused or expanded by specifying a trait known to lead to good solution sets as dominant or recessive, respectively.

Introducing Dominance

Figure 2:
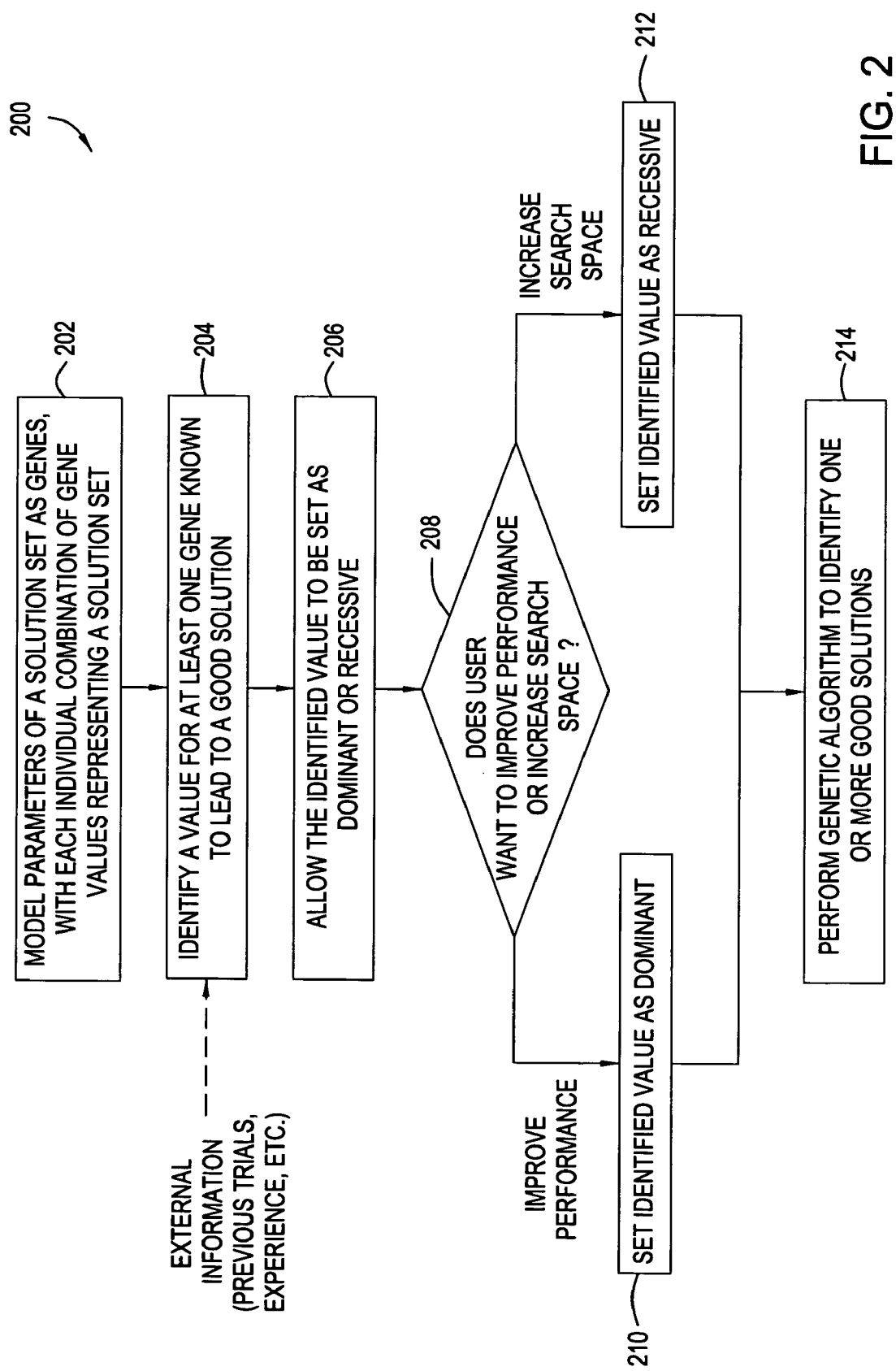
FIG. 2 illustrates a flow diagram of exemplary operations for identifying good solution sets to a multi-parameter problem using genetic algorithms with dominance.

FIG. 2 is a flow diagram of operations 200 that may be performed in preparation of performing a genetic algorithm in an effort to control the search space by introducing dominance to achieve a desired effect (e.g., improved performance or increased search space). The operations 200 begin, at step 202, by modeling parameters of a solution set as genes, with each individual combination of gene values representing a candidate solution set. Any type of variable parameters may be modeled as genes, including parameters having binary or analog values. Rules are known that govern the allowable values for each parameter. For example, if a set of parameters includes coordinate locations of components to layout in an integrated circuit (IC) chip, a set of rules may be defined that prevent the components from interfering with each other. In such a case, the genetic algorithm may be charged with finding a solution set that results in a total length of interconnections (the fitness measure) below a given threshold value.

At step 204, a gene value (or trait) known to lead to a good solution is identified. External information, for example, previous experience or research with a particular problem, may be utilized to advantage in identifying known good traits. For example, continuing with the IC layout example from above, it may be known that locating interface components (e.g., receivers and drivers) that carry signals to and from external components should be located nearer the IC pins. Similarly, internal components that receive these signals from or deliver these signals to the interface components may be located nearby. Other examples of known good traits may include actions that result in favorable outcomes with respect to gaming problems and what is considered a good trait may depend on a desired outcome. For example, in the well known Prisoner's Dilemma game, a group of prisoners gets a higher cumulative score if they all cooperate, while individual prisoners get a higher score if they decide not to cooperate while others do.

At step 206, the identified gene value known to lead to a good solution is allowed to be set as dominant or recessive. For some embodiments a user may be allowed to specify a gene value to be dominant or recessive either directly or indirectly, possibly based on how the user would like to optimize a search for a good solution (e.g., using a GUI, such as those shown in FIGS. 3A and 3B).

Accordingly, in this example, at step 208, a determination is made as to whether the user wants to improve performance (i.e., a quick search) or increase search space. If the user wants to improve performance, the identified gene value is set as dominant, at step 210. On the other hand, if the user wants to increase search space, the identified gene value is set as recessive, at step 212. In either case, at step 214, the genetic algorithm is performed to identify one or more good solutions, with the performance of the algorithm depending on the dominance setting of the identified good gene value.

For some embodiments a user may be allowed to specify a gene value to be dominant or recessive either directly or indirectly, for example, via one or more graphical user interface (GUI) screens. For example, FIG. 3A illustrates an exemplary GUI screen 300 in which the user may directly specify a gene value 306 to be dominant. While the illustrated GUI screen 300 does not allow a gene to be directly specified as recessive, specifying an alternate value (e.g., "a") as dominant may have the same effect. As illustrated, the GUI screen may also allow a user to add or remove genes (via another GUI screen accessed via a button 308) and define a fitness evaluation formula used to determine the fitness of each candidate solution set(via another GUI screen accessed via a button 310). What constitutes a good candidate solution may also be defined, for example, by specifying a threshold (min or max) fitness value a good candidate solution should achieve.

FIG. 3B illustrates an exemplary GUI screen 320 in which the user may indirectly specify a gene value to be dominant or recessive. As illustrated, the user may specify, in a window 324, a search optimization option of quick or expanded. If the quick search option is selected, known good gene values 322 may be automatically specified as dominant. If the expanded search option is selected, known good gene values 322 may be automatically specified as recessive. For some embodiments, a hybrid approach may be taken. For example, a gene value may be initially specified as dominant, but subsequently changed to recessive if a solution set achieving a desired level of fitness is not reached. Alternatively, a gene value may be initially specified as recessive, but subsequently changed to dominant if a solution set achieving a desired level of fitness is not reached in a given amount of time.

Figure 4:
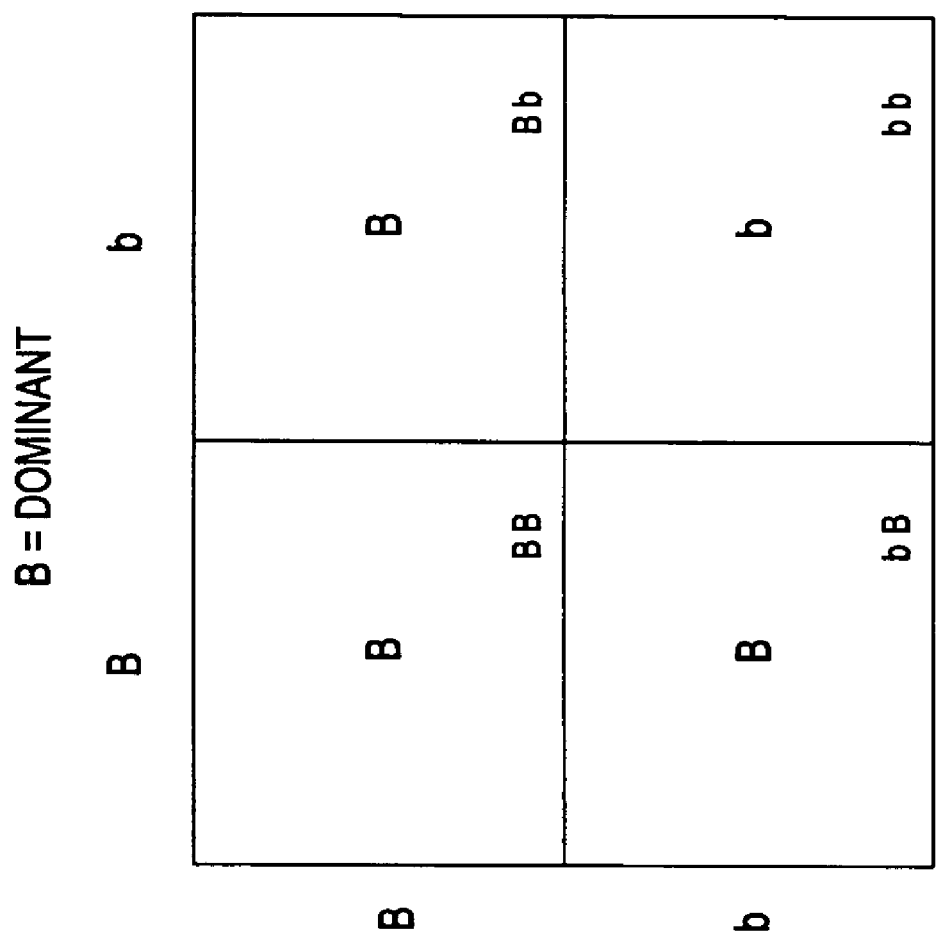
FIG. 4 illustrates an exemplary dominance scheme.

Exactly how a gene is specified as dominant (or recessive) may vary with different embodiments. In some cases, a gene may have only two possible values, and a simple dominance scheme illustrated in FIG. 4 may be applied. FIG. 4 illustrates an exemplary table 4 listing the resultant gene values for the offspring of two "parent" solution sets having the gene values listed in each box. The gene has two possible values of B and b with B specified as dominant. As illustrated, of the four possible combinations, only one (b-b) results in the recessive gene (b) in the child. An opposite result may be achieved if B were specified as recessive. As previously described, such dominance attributes for a system may be specified in an array that specifies the dominance of possible values for each gene. More elaborate dominance schemes may be employed to introduce the concept of dominance for genes having more than two values, such as assigning a range of dominance for each possible value, with a gene value having a larger value dominance attribute winning out over a gene value having a lesser value dominance attribute.

Figure 5:
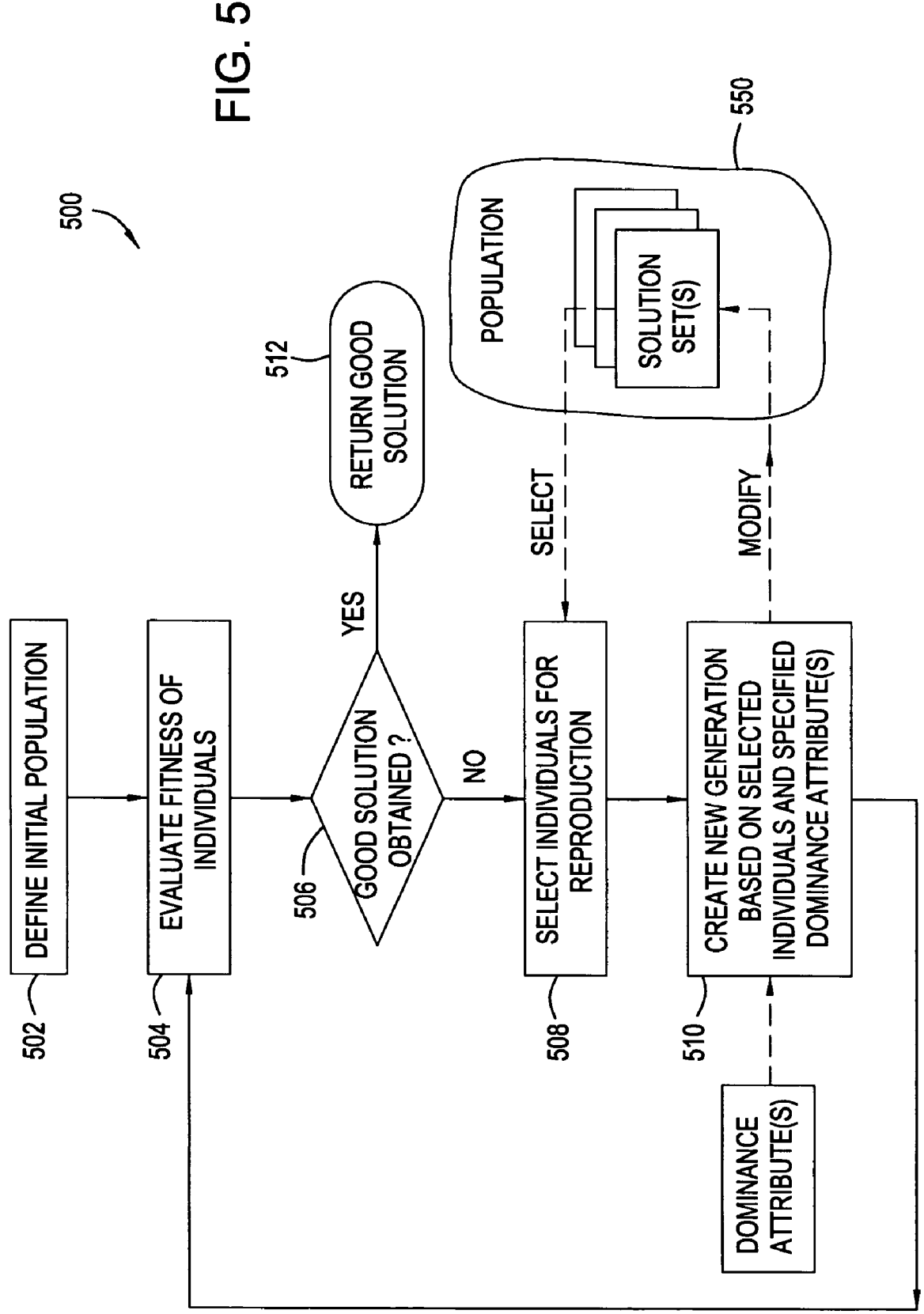
FIG. 5 illustrates a flow diagram of exemplary operations for performing a genetic algorithm using principles of dominance.

In any case, once the dominance attributes have been specified, the genetic algorithm may be performed to identify one or more good candidate solution sets. FIG. 5 illustrates exemplary operations 500 that may be performed as part of the genetic algorithm. The operations 500 begin, at step 502, by defining an initial population. The initial population may be pre-defined, specifying gene values for each individual candidate solution set 124 or gene values may be assigned randomly.

At step 504, the fitness of the individual candidate sets 124 is evaluated. The fitness of each candidate set 124 may be recorded so that it need only be evaluated once. At step 506, a determination is made as to whether a good solution set has been found, for example, by comparing the fitness scores of each individual candidate set 124 to a predefined value. If a good solution is obtained, that solution is returned, at step 512.

If a good solution set has not been found, operations 504-510 may be iteratively performed to create and evaluate a changing population 550 of candidate solution sets 124 until a good solution set is found. At step 508, individual solution sets 124 from the population 550 are selected for reproduction, for example, based on their evaluated fitness values and any other type selection methodology, with non-selected solution sets removed from the population. At step 510, a new generation of candidate solutions is created based on the selected individuals and specified dominance attributes 128, using any suitable type reproduction techniques, and added to the population 550.

Processing then returns to step 504, to evaluate the fitness of new members of the population. For some embodiments, the operations 504-510 may be performed either until a defined good solution set has been found or until a pre-defined number of iterations has been reached, after which the candidate solution set 124 resulting in the best fitness score may be returned.

For some embodiments, a certain gene value may not be present in one of the individual gene sets (e.g., that individual may be missing that gene). In such cases, the corresponding values from one or more other individual sets may be used to determine the value of the parameter corresponding to the missing gene. Further, for some embodiments, the one or more dominance attributes may change over iterations (e.g., as the population evolves).

Figure 6B:
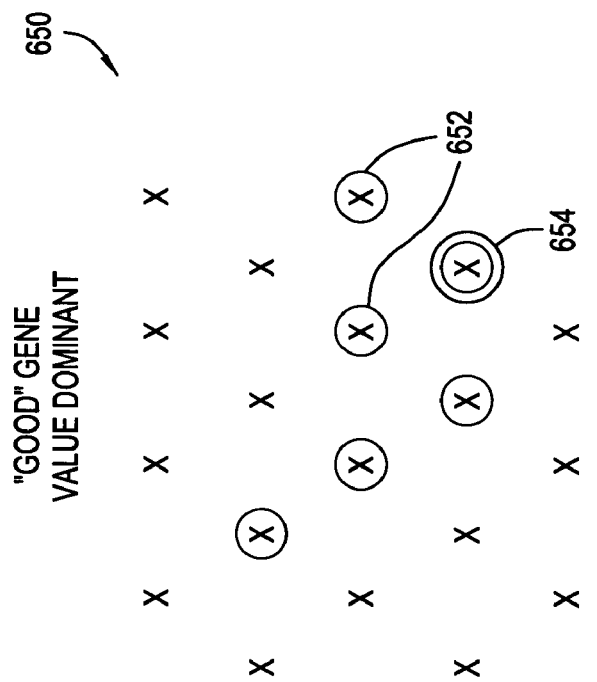
FIGS. 6A and 6B illustrate exemplary expanded and narrowed search spaces achieved by specifying a gene value as recessive or dominant, respectively.
Figure 6A:
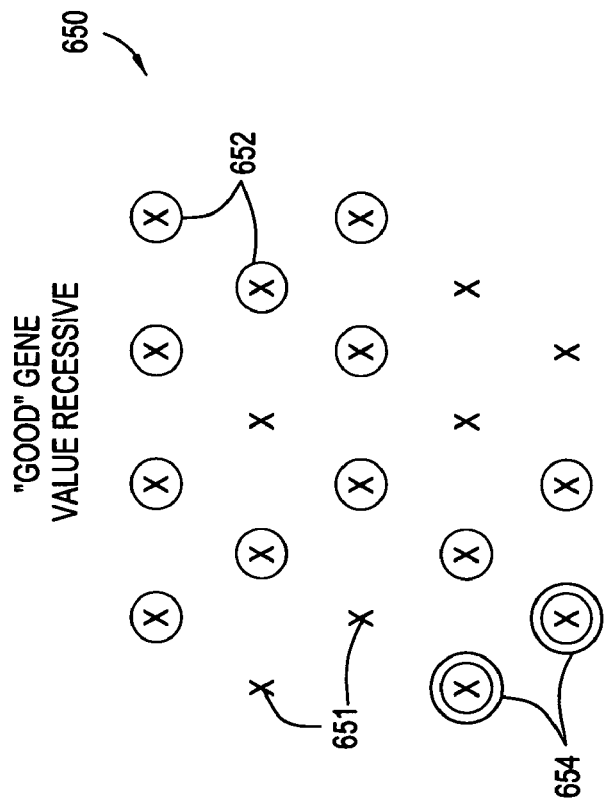

In any case, the relative number of candidate solution sets evaluated, and thus how quickly a solution is returned, may vary widely depending on whether a gene value known to lead to a good solution was specified as dominant or recessive. This is illustrated in FIGS. 6A and 6B, which illustrate a set 650 of all possible candidate solution sets 651, with a good gene value specified as recessive or dominant, respectively. As illustrated in FIG. 6A, with the good gene value specified as recessive, that gene value will not be exhibited as often in future generations and the search space may be expanded, with a larger number of candidate solutions sets 652 actually evaluated. As a result of evaluating a larger number of candidate solution sets (i.e., exploring more options), a better solution set 654 may be returned.

On the other hand, with the good gene value specified as dominant (FIG. 6B), that gene value will show up more often in future generations, effectively shrinking the gene pool, and a good solution set 654 may be found more quickly. However, because fewer solution sets 652 are actually evaluated, the probability of overlooking (never creating and evaluating) a possibly better solution set is increased. Referring back to FIG. 6A, expanding the search space may also lead to a greater number of good solution sets 654, which may provide a greater deal of flexibility to an end user, who may be able choose from the good solution sets 654, for example, considering factors that may not have been factored into the evaluation formula.

CONCLUSION

Based on external information, such as previous experience or research, a user may be aware of one or more parameter values that lead to good solutions to multi-parameter problem. By modeling the parameters as genes and allowing such known good values to be specified as dominant or recessive, the user may be able to tailor the operation of a genetic algorithm used to identify solution sets to their particular needs, for example, to find a solution quickly or increase the search space in an effort to ensure a greater number of candidate solution sets are evaluated.

While the foregoing is directed to embodiments of the present invention, other and further embodiments of the invention may be devised without departing from the basic scope thereof, and the scope thereof is determined by the claims that follow.

What is claimed is:

1. A computer-implemented method for selecting a combination of parameter values for use in determining a candidate solution for a problem involving multiple parameters, comprising:

representing the multiple parameters as an individual containing multiple sets of genes, each gene having a set of allowable gene values for one of the multiple parameters;

specifying, via one or more configurable dominance attributes, that an allowable gene value representing a known preferred value for that gene recessive;

initializing a population of individuals, each comprising multiple sets of genes with corresponding gene values;

performing a genetic algorithm to evolve the population and to select one or more individuals, wherein the population is evolved based, at least in part, on the one or more specified dominance attributes, and wherein specifying the known preferred gene value as recessive increases a search space evaluated by the genetic algorithm;

determining the candidate solution from the evolved population; and storing the candidate solution for the problem, wherein the candidate solution specifies a value for each of the multiple parameters.

2. The method of claim 1, wherein:

at least one of the gene values from one of the gene sets is not present; and the corresponding value from the other gene set or sets is used to determine the value of the corresponding parameter.

3. The method of claim 1, wherein the one or more specified dominance attributes may change as the population evolves.

4. The method of claim 1, wherein performing the genetic algorithm comprises:
    generating a fitness score for combinations of gene values using a fitness evaluation equation.

5. The method of claim 4, comprising selecting one or more individuals based on their corresponding fitness scores.

6. The method of claim 1, wherein specifying that an allowable gene values representing the known preferred value for that parameter is recessive comprises maintaining an array of dominance attributes for one or more gene values.

7. The method of claim 1, wherein specifying that allowable gene value representing the known preferred value for that parameter recessive comprises specifying an optimization option.

8. The method of claim 7, wherein specifying an optimization option comprises specifying at least one of a performance optimization option or an expanded search optimization option.

9. A computer-readable storage medium, containing a program for use in identifying at least one combination of parameter values for use in solving a problem involving multiple parameters which, when executed by a processor performs operations comprising:
    representing the multiple parameters as a set of genes, each gene having a corresponding set of allowable gene values, wherein each of the set of allowable gene values may be specified as being a dominant or recessive trait for that gene value;
    providing an interface allowing a user to specify, via a configurable dominance attribute, that an allowable gene value representing a known preferred value for that gene is recessive;
    initializing a population of candidate solution sets, each comprising a set of genes with corresponding gene values;
    performing a genetic algorithm to modify the population and to select one or more combinations of parameter values, wherein the population is modified based, at least in part, on the specified dominance attribute, and wherein specifying the known preferred gene value as recessive increases a search space evaluated by the genetic algorithm;
    determining the candidate solution from the evolved population; and
    storing the candidate solution for the problem, wherein the candidate solution specifies a value for each of the multiple parameters.

10. The computer-readable medium of claim 9, wherein providing an interface allowing a user to specify that an allowable gene value representing the known preferred value for that parameter recessive comprises providing an interface allowing the user to specify an optimization option.

11. The computer-readable medium of claim 9, wherein providing an interface allowing a user to specify that an allowable gene value representing the known preferred value for that parameter is recessive comprises providing an interface allowing the user to identify and specify as dominant a plurality of gene values.

12. The computer-readable medium of claim 11, wherein the plurality of gene values correspond to more than one gene.

13. The computer-readable medium of claim 11, wherein performing the genetic algorithm comprises:
    generating a fitness score for combinations of gene values using a fitness evaluation equation; and
    selecting individual combinations of gene values for use in modifying the population based on the corresponding fitness scores.

14. The computer-readable medium of claim 13, wherein modifying the population comprises:
    selecting a parenting pair of combinations of gene values; and
    creating a new combination of gene values containing at least one gene value determined based on gene values contained in the parenting pair and a dominance attribute.

15. A system, comprising:
    a population of candidate solutions, each comprising a combination of gene values for use in solving a problem involving multiple parameters, and wherein at least one of the parameters has a known, preferred value for a solution to the problem;
    a genetic algorithm for use in evaluating fitness of the candidate solutions, modifying the population of candidate solutions based, at least in part, on the fitness of the candidate solutions and the dominance attribute, and to identify one or more good candidate solution sets, and wherein specifying the known preferred gene value as recessive increases a search space evaluated by the genetic algorithm; and
    an interface allowing a user to configure at least one dominance attribute used to specify that a gene value representing the preferred value is recessive, wherein the interface is configured to perform the genetic algorithm on the population based on the on the gene value specified as recessive and further configured to select a candidate solution from the population, based on the fitness of the candidate solution, and wherein the selected candidate solution specifies a value for each of the multiple parameters.

16. The system of claim 15, wherein the interface allows the user to explicitly specify one or more gene values as dominant or recessive.

17. The system of claim 15, wherein the interface allows the user to specify one or more gene values known to lead to desired solutions.

18. The system of claim 15, wherein the interface allows the user to specify the gene value should be either dominant initially or recessive initially and then changed depending on whether a desired result is achieved.

19. The system of claim 18, wherein the desired result comprises at least one of: finding a solution having a desired fitness score or finding a solution having a desired fitness score in a given amount of time.

* * * * *